Figures 1, 2A, 2B:
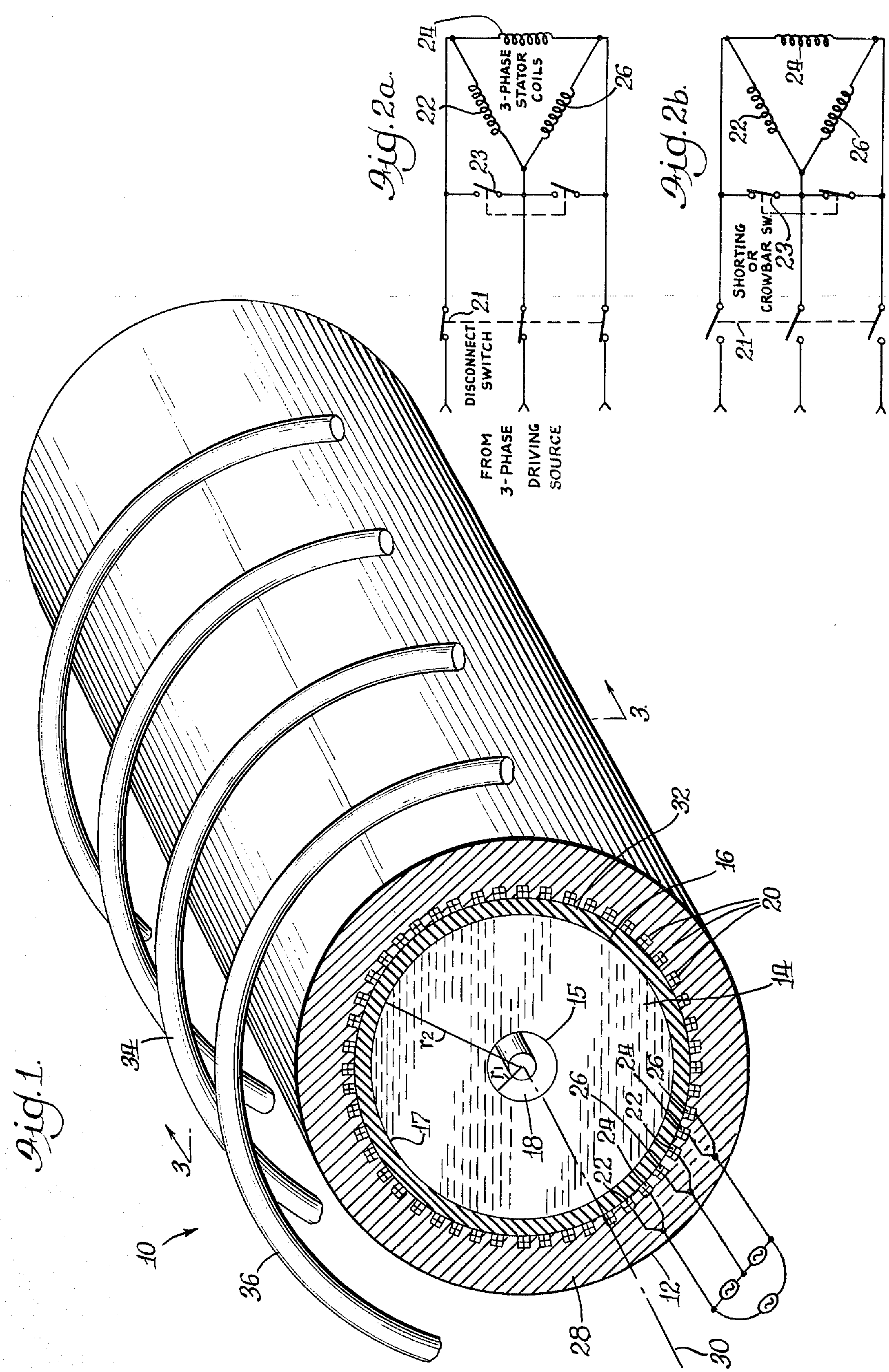

United States Patent [19]
Schaffer

[11] 4,252,605
[45] Feb. 24, 1981

[54] SELF-IMPLODING LINER SYSTEM FOR MAGNETIC FIELD COMPRESSION

[75] Inventor: Michael J. Schaffer, San Diego, Calif.

[73] Assignee: General Atomic Company, San Diego, Calif.

[21] Appl. No.: 824,556

[22] Filed: Aug. 15, 1977

[51] Int. Cl.[3] .................. G21B 1/00
[52] U.S. Cl. .................. 176/1; 310/10; 315/111.4; 313/161
[58] Field of Search .................. 176/1, 3; 313/231.3, 313/231.4; 315/111.4, 111.5, 111.7 310/10; 310/166; 310/11

[56] References Cited

U.S. PATENT DOCUMENTS

| | | | |
|---|---|---|---|
| 2,990,485 | 6/1961 | Lee | 310/11 |
| 3,113,427 | 12/1963 | Meyer | 176/1 |
| 3,224,818 | 12/1965 | Sixsmith | 308/10 |
| 3,593,051 | 7/1971 | Akbar | 310/166 |
| 4,076,988 | 2/1978 | Litz | 310/10 |

FOREIGN PATENT DOCUMENTS

| | | | |
|---|---|---|---|
| 2431593 | 6/1975 | Fed. Rep. of Germany | 313/231.3 |

OTHER PUBLICATIONS

Proceedings of the High Beta Workshop, Jul. 28–Aug. 1, 1975, pp. 60–77, by Robson et al.
The Physics of Fluids, vol. 17, No. 3, 3/74, pp. 662–663, Book et al.
Sixth Symposium on Engineering Problems of Fusion Research, Nov. 18–21, 1975, pp. 983–987, Turchi et al.

*Primary Examiner*—Harvey E. Behrend
*Attorney, Agent, or Firm*—Fitch, Even, Tabin, Flannery & Welch

[57] ABSTRACT

Methods and apparatus for compressing a lower strength magnetic field to produce high flux densities, such as about one megagauss, employing a hollow, rotating, electrically conductive liquid liner to trap the magnetic flux, and in which the rotating liner is magnetically forced to implode. Energy to drive the implosion is derived from the rotational energy of the liner. Energy may be recovered subsequently as rotational energy upon expansion or rebound of the liner.

5 Claims, 12 Drawing Figures

3-PHASE STATOR COILS
DISCONNECT SWITCH
FROM 3-PHASE DRIVING SOURCE
SHORTING OR CROWBAR SW.
10
12
14
15
16
17
18
20
21
22
23
24
26
28
30
32
34
36
3
r1
r2

Fig. 8.
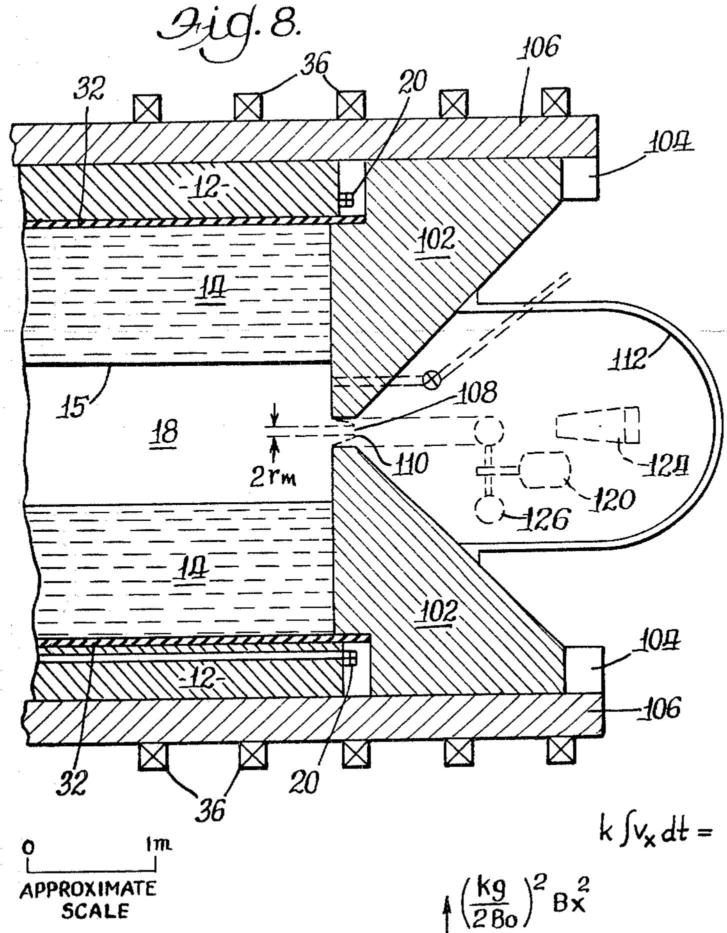
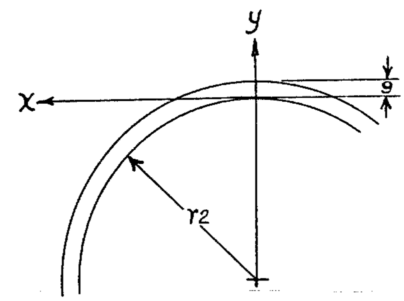
Fig. 9.
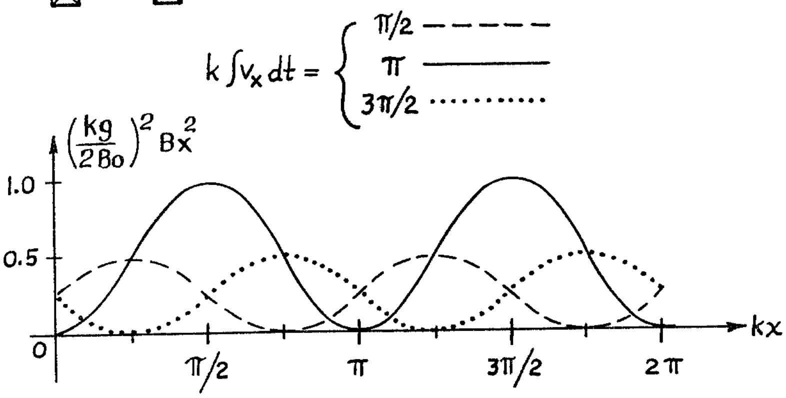
Fig. 10.
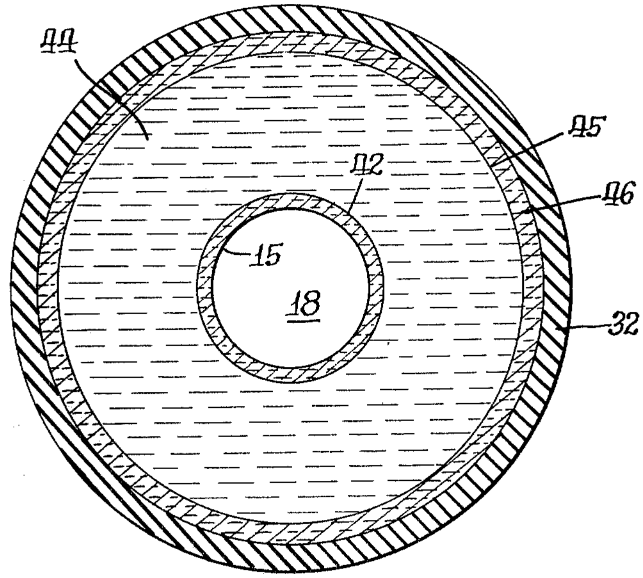
Fig. 11.

SELF-IMPLODING LINER SYSTEM FOR MAGNETIC FIELD COMPRESSION

The present invention generally relates to physics and, more particularly, to methods and apparatus for providing high intensity pulsed magnetic fields. Various aspects of such systems may also have utility in respect of confining high kinetic energy plasma at elevated temperatures.

Imploding liners have been used extensively for the production of very strong magnetic fields and highly compressed gases. In this connection, imploding metallic cylindrical liners have been used for many years to compress a trapped axial magnetic field to high (e.g., megagauss) levels. [Conference on Megagauss Magnetic Field Generation by Explosives and Related Experiments, Frascati, September 21–23, 1965, Euratom publication EUR b 2750.e (1966), and H. Knoepfel, *Pulsed High Magnetic Fields* American Elsevier, New York (1970); bracketed references are incorporated herein by reference].

It has also been suggested that this technique might be useful for pulsed nuclear fusion applications [Linhart et. al., Nuclear Fusion Suppl. Pt. 2, 733 (1962)].

Fusion concepts based on imploding linear techniques have been undertaken in connection with plasma confinement apparatus designated by the NRL group in the United States as LINUS apparatus [R. A. Shanny et al., Proceedings of the Second Topical Conference on Pulsed High-Beta Plasmas (Max Planck Institute für Plasma Physik, Garching, West Germany, 1972), paper G10 page 205 et seq. A. E. Robson, NRL Memorandum Report 2616 (1973) hereby incorporated herein by reference].

However, conventional methods and apparatus for providing imploding magnetic fields have involved the utilization of high peak power external energy sources such as explosives, capacitatively or inductively driven magnetic field coils, or hydraulic or pneumatic systems. For example, in respect of the previously referred to LINUS apparatus, the implosion of a 120 meter long liner by a pulsed magnetic field of 100–200 kG produced by $\theta$-pinch-like techniques, would involve the use of over $2\times10^9$ Joules of electrical energy delivered in about 100 microseconds. This requirement for high peak power, which must be supplied by capacitive or inductive energy storage, is a principal deterrent to the development and utilization of imploding liner magnetic flux compression systems.

The use of a relatively thick rotating liquid liner has been suggested. Although the use of a massive, thick liner still involves the use of a high peak power system, the thick liner presents a mechanical impedance level suitable for driving an implosion by hydraulic or pneumatic energy transfer, and appears to be more attractive than capacitive or inductive energy storage energy transfer systems. [T. Ohkawa, Kakuyugo-Kenkyu, Vol. 29, page 339 et seq. (1973); copending application Ser. No. 622,089 filed Oct. 14, 1975].

However, previous imploding liner compression systems have various disadvantages, including the requirement for large energy storage systems suitable for high peak power, liner component destruction, mechanical complexity, high energy consumption and/or slow cycle time. It is an object of the present invention to provide improved imploding liner systems which are capable of effective compression and which may be adapted to provide for multiple compression cycles, without the need for large external high-peak-power energy storage. It is a further object to provide such methods and apparatus which may be used to recover a part of the implosion energy on rebound.

Figure 3:
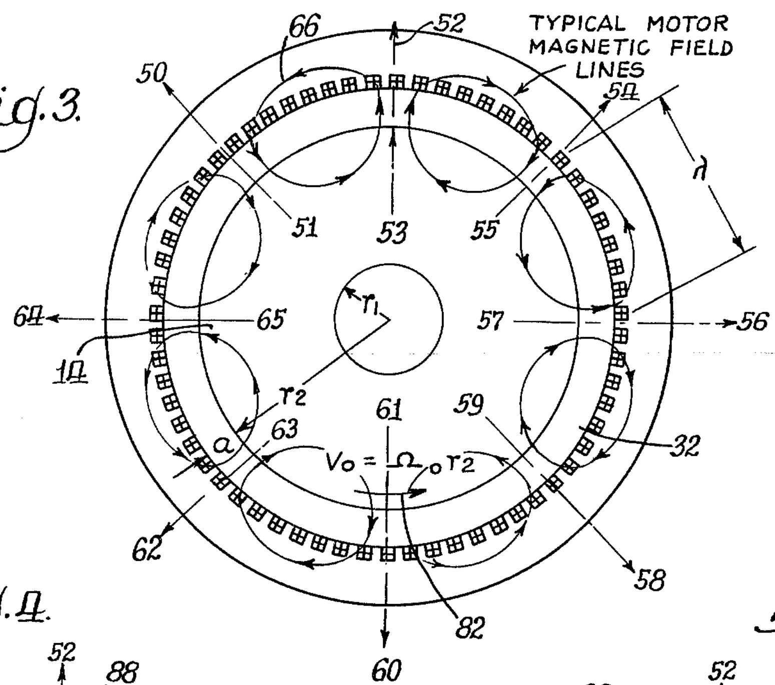
Figure 4:
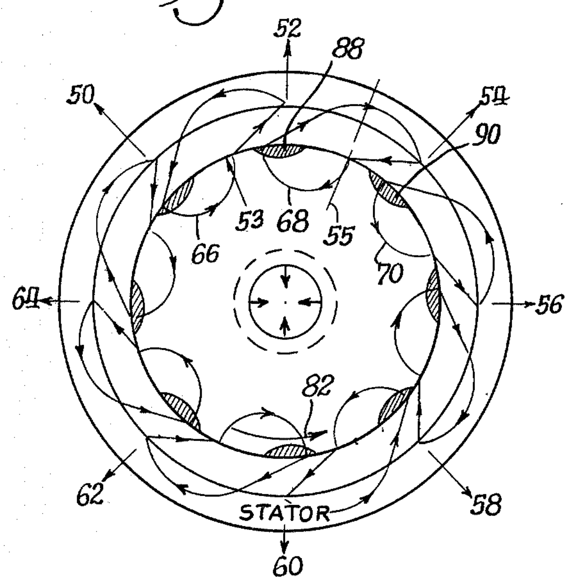
Figure 5:
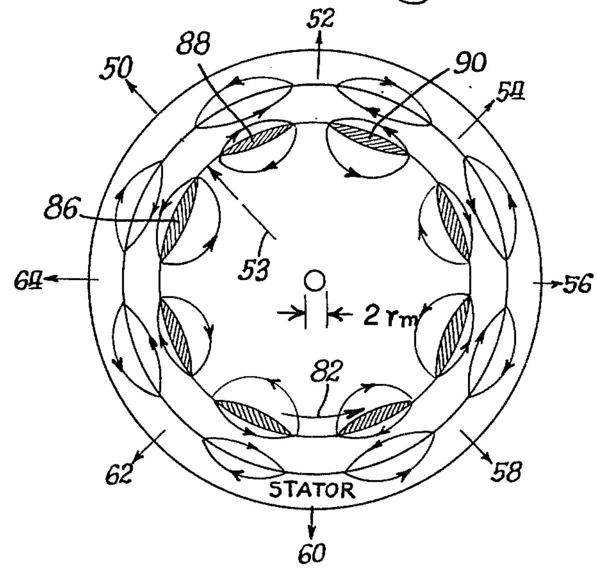
Figure 6:
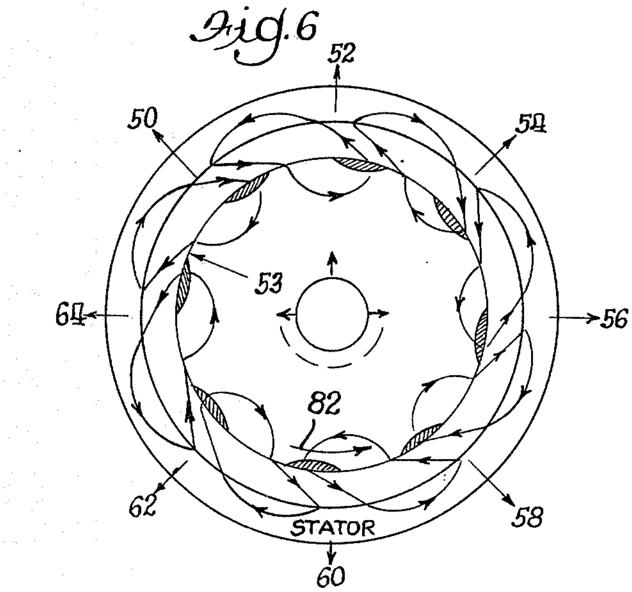
Figure 7:
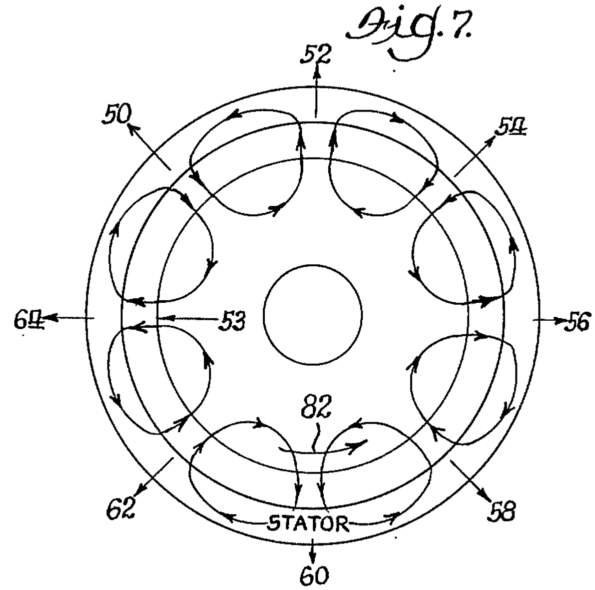

These and other objects of the invention will become apparent upon consideration of the following detailed description and the accompanying drawings, of which:

FIG. 1 is a perspective view, partially broken away, of an embodiment of imploding liner compression apparatus in accordance with the present invention, FIGS. 2*a* and 2*b* are schematic electrical circuit diagrams of the apparatus of FIG. 1, FIG. 3 is a cross sectional view of the apparatus of FIG. 1 taken through line 3—3, and illustrating magnetic field lines while the liner is being rotated by the magnetic field of the stator and at the beginning of an implosion cycle, FIG. 4 is a view like that of FIG. 3 illustrating magnetic field and liner configuration about half way through implosion, FIG. 5 is a view like that of FIG. 3 illustrating magnetic field and liner configuration at the end of implosion (peak compression), FIG. 6 is a view like that of FIG. 3 illustrating magnetic field and liner configuration during rebound of the system from peak compression, FIG. 7 illustrates the magnetic field and liner configuration at the end of one complete cycle with respect to FIG. 3, FIG. 8 is a cross sectional, axial view illustrating the end configuration of the apparatus of FIG. 1, FIG. 9 is a schematic diagram illustrating the approximately equivalent slab coordinate system used in analysis of the self-imploding process, FIG. 10 is a graph of the magnetic field in the insulating gap of the apparatus of FIG. 1 as a function of time and space, and FIG. 11 illustrates an embodiment of the present invention incorporating a stratified liner.

Generally, the present invention is particularly directed to methods and apparatus for compressing magnetic flux to high flux levels although it may be readily adapted for the compression of gases. The invention may also be adapted for the compression and confinement of high temperature plasmas such as hydrogen plasmas.

In connection with apparatus aspects of the present invention, the apparatus generally comprises rotating (or rotatable) liner means, and induction motor stator means for confining and rotating the liner means. The induction motor stator means provided with a suitable electric power source, produces a rotating magnetic field configuration within the stator and induces an opposing current in the electrically conductive liner means. Rotational torque to drive the liner means at a desired angular rotational velocity is thus provided.

The liner means will generally comprise a liquid conductive fluid, and the stator means will provide for confining the liner within the stator to be acted upon by the stator magnetic field. Such confinement should best provide a circularly cylindrical shape for the liner periphery. The liner will have a compression zone along its axis of rotation for the gas or other fluid to be compressed (as used herein in the context of fluid compression, the term "fluid" includes magnetic flux). The axial compression zone may be maintained as a vortex zone in the liner through centrifugal force effects on the liner.

The apparatus further comprises means for short-circuiting the current coil configuration (windings) of the induction motor stator means, so that the magnetic field configuration of the stator ceases to rotate, while maintaining current carrying and magnetic field generating capability of the stator. In operation, the short-circuit means serves to conserve or "freeze" the magnetic flux of the stator in the configuration it had at the time of short-circuiting. Similarly, the electrically conductive liner conserves its magnetic flux. The resulting stationary stator magnetic field configuration interacts with the rotating field configuration of the liner to produce opposing magnetic fields of high intensity in the insulating gap that separates liner and stator to exert an abrupt compressive force on the periphery of the liner, which is transmitted to the compression zone at the center of the liner.

In connection with the present methods, a liquid, electrically conductive liner is inductively rotated within a stator zone and around a compression zone provided axially thereof. A magnetic field or fluid may be provided longitudinally along the axis of rotation. The longitudinal magnetic field or fluid is compressed by stopping the rotation of the stator inductive motor field while continuing the revolution of the liner to provide for oppositional alignment of the liner field and stator field, forcing the liner fluid inwardly in the zones of oppositional alignment.

Turning now to the drawings, the present invention will now be more particularly described with respect to the embodiment of apparatus shown in FIG. 1, which is a perspective view, partially broken away, of compression apparatus 10 illustrating various features of the invention. The illustrated apparatus 10 comprises induction motor stator means 12 defining a cylindrical bore for confining rotatable liner means 14 and for providing a rotating magnetic field therein to rotate the liner 14. The liner means and the stator means function as an induction motor to provide for rotation of the liner within the bore in accordance with known principles of induction motor operation [e.g., D. C. Fink et al., Standard Handbook for Electrical Engineers, Section 18, McGraw Hill, New York (10th ed., 1969), and other induction motor texts].

The liner means 14 provided in the cylindrical bore defined by the interior surface 16 of the electrically insulating wall 32 of the stator means 12, will generally comprise a liquid material having high electrical conductivity such as liquid mercury, lithium, copper, aluminum, lead, sodium, mixtures thereof (e.g., sodium-potassium mixtures, Woods metal, etc.). The liner may have a layered structure, as will be described in more detail hereinafter. Thus, the liner has a substantially fluid structure which readily permits radial transmission of compressive forces, as will be described in more detail hereinafter. The quantity of the liquid liner material confined within the bore of the apparatus 10 is insufficient to completely fill the bore at the temperature conditions of operation (e.g., at least the melting temperature of liner materials, intended to be in a fluid state). In this regard, upon rotation of the liner, centrifugal force effects will cause the liner to be forced radially outward against the inner wall 16 of the stator means 12, leaving an axially symmetrical cylindrical vortex zone 18 as the compression zone at the center of the liner 14.

In the illustrated embodiment the normal, uncompressed inner radius $r_1$ of the rotating liner 14 will be in the range of from about 25 cm to about 100 cm depending on the compression volume and compression ratio desired. The liner is relatively thick, and in this connection, the ratio of the outer radius $r_2$ to the inner radius $r_1$ of the rotating liner means 14 will be at least about 3, and preferably in the range of from about 4 to about 6. In the illustrated embodiment, the outer radius $r_2$ of the liner 14 will best be in the range of from about 1 to about 6 meters.

The outer surface 17 of the rotating liner means 14 is defined by an electrically insulating annular cylinder or gap means 32, forming the inner surface of the stator means 12, is of circular cylindrical shape and uniform circular cross-section.

Since the inner surface 15 of the rotating liner means 14 is formed by rotational forces, it will be of circular cylindrical shape of uniform circular cross-section and concentric with the stator.

As indicated, while the rotating liner means may comprise a single homogeneous liquid metallic conductor throughout its thickness, it may also have a layered structure of materials of different densities, [such as described in my copending application Ser. No. 824,558 entitled "Blanket Design for Imploding Liner Plasma Systems" filed concurrently herewith]. Because the illustrated liner embodiment has magnetic interaction functions in respect of both its outer boundary at surface 17 and its inner boundary at surface 15, metallically conductive layers must be provided adjacent both the inner and outer surfaces of the liner (i.e., either at the surface or within functionally effective electro-magnetically interactive range of the surface) if a layered liner structure is employed. In this connection, an inner, conductive flux compressing layer may be relatively thin, such as in the range of from about 1 mm up to the full thickness of the liner. At the outer surface, a metallic conductive layer should provide close magnetic coupling with the stator, although a thin low viscosity non-electrically conductive surface layer of a relatively dense material, such as the molten salt mercurous fluoride ($Hg_2F_2$), may be advantageously employed to reduce magnetohydrodynamic turbulence, although the thickness contribution of such a layer to the effective insulating gap thickness will have to be considered.

As indicated, the liner 14 is confined and caused to rotate by inductive interaction with a rotating magnetic field configuration provided by the stator means 12. In this connection, the illustrated stator 12 is adapted to provide a multipolar magnetic field configuration in the liner zone internally of the bore by means of a primary motor winding 20, which in the illustrated embodiment may be arranged for a multi-phase power supply (such as a three-phase supply) with a corresonding plurality of sets (such as three) of exactly similar multipolar conductor groups spaced 1/n of a pole pitch apart, where n is the number of phases. The superposition of the plurality of stationary but alternating magnetic fields produced by the multiphase windings produces a sinusoidally distributed multipolar magnetic field revolving in synchronism with the power supply frequency. Generally, the stator should best have in the range of from about at least six poles to about twenty poles, and in the illustrated embodiment, a three-phase, sixteen pole stator winding is shown comprising forty-eight conductive coils arranged in phase groups 22, 24, 26 which are regularly spaced in azimuthally symmetrical array about the inner periphery of the stator casing 28. The stator casing 28 may be constructed of a material such as laminated motor steel, and should, of course, be sufficiently strong to withstand the rotational, compressive and expansive forces generated by the apparatus 10. The coils 22 supplied with one phase of the power supply, the coils 24 supplied with the second phase, and the coils 26 supplied with the third phase are adjacent and spaced one-third of a pole pitch apart in the illustrated embodiment and the coil conductor windings extend longitudinally of the axis 30 of the apparatus 10 so as to create a cylindrical field configuration. The end connections, power connections and other aspects of the three-phase windings 22, 24, 26 and associated stator design may generally be in accordance with induction motor art. Particular end connection features are shown in FIG. 1.

The coils 22, 24, 26 of the illustrated embodiment, in conjunction with the power supply are adapted to provide a steady rotation of the liquid liner 14 at an appropriate angular velocity at least sufficient to stabilize the inner surface of the liner against the Rayleigh-Taylor instability (to be described hereinafter), which velocity depends on the mass density of the liner material, the peak value of the compressed magnetic field, the radius of the inner surface 15 of the liner at the moment of peak compression and on the compression ratio. The rotational velocity may, for example, range from about 50 rpm for large diameter mercury liners to over 500 rpm for small diameter liners of lithium, sodium or sodium-potassium mixtures. The field strength that is provided by the stator coils 22, 24, 26 should be at least sufficient to accommodate the turbulent viscous losses, and in the illustrated embodiment, may be about 0.1 T (e.g., 1,000 gauss). In practice, the additional requirements imposed by the liner implosion process will demand much larger field strengths, e.g., 1.3 T in the illustrated embodiment, as explained hereinafter. A plurality of pairs of coils are shown in the drawing to provide a magnetic field configuration which will be described in more detail hereinafter.

The coils 22, 24, 26 may be made from a plurality of relatively thin insulated copper bar strips, as shown in the drawing, in a manner similar to the construction of stator windings of large alternating current alternators. The bars are adapted to carry electric current in a component parallel to the axis 30 of the bore, and the coils 22, 24, 26 extend beyond the ends of the bore where they may bend around to be continuous with an opposite coil, as shown in FIG. 8. The illustrated coils thus extend the full length of the bore, which will depend on the use and design parameters of the system. The axial length of the bore, for example, could be less than a meter for magnetic field compression materials testing apparatus, several meters for plasma compressing systems, and some tens of meters for systems for plasma compression to or approaching thermonuclear temperature. Appropriate provision for power input for each of the three sets of coils is made as shown, for example, in FIGS. *2a* and *2b*.

The coils together generate a rotating magnetic field configuration which must penetrate and electromagnetically interact with liner 14 to act upon it. As indicated, an intermediate electrically insulating layer 32 is provided which is preferably fabricated from nonconducting or semi-conducting materials, so that eddy currents will not circulate from the liner to the stator.

Means 34 is also provided for producing a magnetic field longitudinally of the axis of rotation of the liner, and in the illustrated embodiment, such means comprises a conductive, magnetic coil 36 which axially encircles the stator 12 for providing a relatively uniform axial magnetic field, which may, for example, be in the range of from about 500 to about 2,000 gauss in the illustrated embodiment along the length of the bore parallel to the axis 30. Coils 36 of the axial field means 34 carry electric current around the apparatus in the azimuthal direction as shown and produce a steady magnetic field within the bore. The spacing and design of the coils 36 may result from consideration of factors such as field homogeneity in the rotating liner 14, access to the portions of the apparatus between adjacent coils 30, the field strength limitations of conducting or superconducting materials, and various other structural considerations which are within the skill of the art in view of the present disclosure. The power supply to the azimuthal coils 36 of the illustrated embodiment may be provided by any suitable source of direct current, such as a rectifier or other dc power source.

To compress the longitudinal magnetic field liner-generated magnetic forces are utilized to drive the liner 14 inward as will now be described in more detail.

Prior to initiating an implosion, the liner 14 is induced to rotate in the induction motor stator 12 at predetermined rotational velocity which may generally be nearly synchronous with the rotational velocity of the stator field, which is determined by the frequency of the external three-phase driving source indicated in FIG. *2a*. Therefore, the motor field will have substantially fully permeated into the liner 14, as shown in FIG. 3. This magnetic flux is, thus, temporarily frozen in the liner. To initiate an implosion, three-phase driving source is disconnected from the stator, and the stator coils are all rapidly and simultaneously short-circuited, as shown in FIG. *2b*. This has the effect of temporarily freezing or trapping the magnetic flux of the stator in the stator, and it abruptly stops the rotational velocity of the stator field to produce a stationary field configuration within the stator. However, the liner 14 and the magnetic field configuration associated therewith, continues to rotate due to rotational kinetic energy of the liner, as shown in FIGS. 3–7. In effect, the liner acts as the rotor of an alternator that has been suddenly short-circuited, and whose very large short-circuit electric current generates a correspondingly large magnetic field in the insulating gap, and the force of this large magnetic field exerts a compressive force on the liner.

FIGS. 3–7 are cross-sectional views taken along the axis 30 of the apparatus 10 of FIG. 1 and illustrate the magnetic field configuration of the liner 14 and the stator 12 and the insulating layer or gap 32 at various points in an implosion cycle. In FIGS. 3–7, the stator 12 and its magnetic field are stationary, and the rotational direction of the liner 14 and its magnetic field configuration is counterclockwise.

FIG. 3 represents the stator and liner magnetic flux configuration at the instant of short-circuiting the stator coils. This is accomplished in the illustrated embodiment as shown in FIGS. *2a* and *2b* by disconnecting the stator coils 22, 24, 26 from the ac power supply by means of disconnect switch 21, and simultaneously short-circuiting the stator coils by means of shorting or crowbar switch 23. FIG. *2a* illustrates the stator coil connection to the driving source, and FIG. *2b* illustrates the short-circuited system.

In the FIGS. 3–7, the illustrated stator provides a plurality of (eight) magnetic poles, which in FIGS. 3–7 are represented by lines at respective reference numerals 50, 52, 54, 56, 58, 60, 62 and 64, the magnetic field direction of each pole being of alternatingly opposed radial direction as indicated by the direction of the arrows associated with each typical magnetic field line. The liner 14 has trapped in it a complementary magnetic field configuration also having a corresponding number of magnetic poles similarly represented by dashed lines and arrows 51, 53, 55, 57, 59, 61, 63, 65 which are generally aligned with the stator poles. A corresponding number of magnetic circuits 66, 68, 70, 72, 74, 76, 78, 80 is established between the poles of the stator and the liner, and immediately prior to short-circuiting the stator coils, the (counterclockwise) rotation of the stator field configuration and the interaction of the induced liner field with the rotating stator field produces rotation of the liner and its magnetic field configuration.

FIG. 3 represents the magnetic field configuration of the liner and stator at the instant of short-circuiting the stator coils. At this instant (i.e., substantially within the short-circuit switching time), the stator field configuration becomes stationary, and the current associated with the stator field is directed through the closed coil circuits of the stator windings. However, the liner and its field configuration continue to rotate in the (counterclockwise, as indicated by directional arrows 82) direction in which the stator field configuration was previously rotating, so that the relatively aligned relationship of the liner and stator poles and fields is progressively disturbed and progressively increasing repulsive magnetic forces are generated between the stator and liner fields as they progressively become oppositionally aligned.

FIG. 4 illustrates the magnetic configuration of the liner and stator at a point in time in which the liner has traveled less than one half of a stator pole pitch. As the liner 14 advances, a strong mutually repulsive magnetic field component is generated in the gap, tangential to the liner surface, as illustrated in FIG. 4, which exerts a large magnetic pressure on the outer surface of the liner and accelerates it inward. The inward displacement of the liner outer surface leaves the temporary voids, shown in FIGS. 4–6 by shaded areas 86, 88, 90, 92, 94, 96, 98, 100. If the gap width of the induction motor system, g, (which is shown at reference numeral 84 and which may be defined as the radial distance between the outer liner surface 16 and the middle of the windings 20) is much smaller than the stator pole pitch, λ, (e.g., less than about 20 percent of λ), the peak value of the tangential magnetic field may be expressed by $(\lambda/\pi g)B_o$, where $B_o$ is the peak value of the stator magnetic field prior to short-circuiting the stator windings. The stator coils remain short-circuited during the implosion phase, and it may be considered that substantially no energy enters or leaves the system through the stator. The implosion energy is obtained from a slowing of the rotational velocity of the outer region of the liner.

As the outer portion of the liner is forced inward, a corresponding volume decrease is provided in the compression zone 18, at the center of the liner 14. This decrease of volume zone 18 compresses the axial magnetic field provided by coils 36, and thereby increases the axial magnetic flux density. In this connection, the rotating liquid conductive liner means, in accordance with the well-known Faraday's law of electromagnetics, will trap or conserve the longitudinal magnetic flux within the hollow vortex region compression zone 18, so that when the liquid liner is compressed, the cross-sectional area of the vortex compression zone 18 is reduced, thereby compressing the trapped longitudinal magnetic field into a smaller volume and increasing its strength, in accordance with the conservation of magnetic flux.

Of course, if the system is used to compress a fluid such as a gas which does not interact with an axial magnetic field, the gas may be compressed directly by the imploding liner.

FIG. 5 illustrates the magnetic configuration of the system of FIG. 1 when the liner field has advanced into direct opposition with the stationary short-circuited stator field. This is the moment of peak compression.

In many applications the liner may rebound after the implosion with a substantial amount of energy, such as a large fraction of its initial implosion energy. If the system parameters are chosen such that the rotating liner advances two full pole pitches during the implosion and rebound, much of this rebound, or expansion energy can be recuperated, since the large tangental magnetic field component will decelerate the radially expanding liner, and the frozen liner and stator fluxes may be phased so as to reaccelerate the liner fluid. This process is illustrated in FIG. 6, where the expansion forces are exerted in phase relationship, so that expansion (or radial velocity) of the liner is slowed and the liner is reaccelerated in respect of rotational velocity while the liner decreases the oppositional repulsive forces between the liner and stator fields. Thus, the alignment of magnetic fields between the liner and the stator causes conversion of radial, outward kinetic energy to rotational kinetic energy. In FIG. 6, the liner field configuration has rotated more than one stator pole pitch, but less than two pole pitches. FIG. 7 illustrates the magnetic field configuration of the stator and liner when the liner field has rotated two full stator pole pitches. At this time, the short circuit of the stator coils may be removed and the stator may be reconnected to its power source with minimal generation of electrical transients (i.e., switch configuration of FIG. 2*a* from that of 2*b*). Thus, if the stator pole pitch is chosen such that the magnetic field frozen into the liner advances two full stator pole pitches during an implosion and rebound cycle, the stator coils may be smoothly reconnected to their power source, (which has maintained its regular phase velocity), and may be used between implosion cycles as an induction motor to reestablish a predetermined rotational speed. Reconnection of the stator coils to the power source at such a phase position of field alignment reestablishes a rotating stator field configuration in rotational alignment with the rotating liner field configuration.

The strong implosion and magnetic field compression capabilities of thick rotating liners in accordance with the present invention will now be described in somewhat more detail with respect to a liner 14 of mass density, ρ, inner radius $r_1$ and outer radius $r_2$ which, in its implosion may compress an initial, relatively weak axial magnetic field provided by longitudinal winding 34 to a final, relatively stronger value $B_m$, with a final liner inner radius of $r_m$, which is smaller than $r_1$. In order for the inner liner surface 15 to be stable against the Rayleigh Taylor instability, it should rotate with an angular velocity $\Omega_o$ such that $$\Omega_o^2 \gtrsim 2 r_m^2 B_m^2 [5 \mu_o \rho r_1^4 \ln(r_2/r_m)]^{-1} \quad (1)$$

where $\mu_o$ is the magnetic permeability of free space. At such angular velocity, the liner 14 possesses a kinetic energy $W_k$ which may be represented as follows:

$$W_k=(\pi/4)\rho\Omega_o^2(r_2^4-r_1^4) \quad (2)$$

The work $W_m$ required to produce the desired magnetic field $B_m$, which fills the imploded cylindrical compression zone 18 of radius $r_m$, may similarly be represented as follows:

$$W_m=\pi r_m^2B_m^2/2\mu_o=\pi r_m^2B_m^2/2\mu_o \quad (3)$$

Combining Equations 1-3, the ratio of the energy $W_m$ required to produce the relatively stronger field $B_m$, to the available kinetic energy of the liner 12 may be represented by the following ratio relationship:

$$\frac{W_m}{W_k} \leq 5\frac{\ln(r_2/r_m)}{(r_2/r_1)^4-1} \quad (4)$$

From this relationship it may be appreciated that the energy required for compression may be very small compared to the kinetic energy of rotation of the liner in a system with appropriate liner dimensions. For example, where the inner radius $r_1$ is 0.4 meter, the outer radius $r_2$ is 1.6 meters and the compressed inner radius $r_m$ is 0.01 meters, Equation (4) gives a ratio of $W_m/W_k$ which is equal to 0.10.

For such relatively thick rotating liners, half of the kinetic energy of rotation is stored in the outer 15% of the liner, where it may be coupled to by means of the rotating stator magnetic field, as previously described. For purposes of the following discussion, the liner will be treated as a rigid conducting rotor, and, in view of the relatively small liner-stator magnetic gap g, the liner-stator coupling is analyzed in an equivalent Cartesian coordinate system, illustrated in FIG. 9, with negligible error. The azimuthal displacement of the liner is then represented by x, and its peripheral velocity by $v_x=\Omega r_2$. At the time of short-circuiting, the crowbarred motor stator conserves its flux $\Phi_s$, which may be written as follows:

$$\Phi_s=(B_o/k)\sin kx \quad (5)$$

where $k=\pi/\lambda$, $\lambda$ is the pole pitch, and $2kr_2$ is the number of poles of the stator magnetic field configuration. $B_o$ is the peak value of the radial component of the rotating magnetic field before crowbarring. The liner, which moves at a peripheral speed $v_x(t)$, drags along its own frozen flux $\Phi_r$, which may be similarly represented as follows:

$$\Phi_r=(B_o/k)\sin k(x-\textstyle\int v_x dt) \quad (6)$$

Both the stator flux $\Phi_s$ and the liner flux $\Phi_r$ are confined to the liner-stator insulating gap 32 after the stator coils are short-circuited. The separate rotor and stator contributions to the "x" or tangential component of the magnetic field, $B_x$, are calculated by flux conservation. When $kg<<1$ this yields $B_{rx,sx}=\Phi_{r,s}/g$, from which may be obtained the total tangental magnetic field, $B_x$:

$$B_x=B_{rx}+B_{sx} \quad (7)$$

$$=(B_o/kg)\,[\sin k(x-\textstyle\int v_x dt)-\sin kx]$$
$$=-2(B_o/kg)\sin(\tfrac{1}{2}k\textstyle\int v_x dt)\cdot\cos k(x-\tfrac{1}{2}\textstyle\int v_x dt)$$

where the integration is performed from the beginning of an implosion cycle.

The magnetic driving pressure acting on the liner is given by $B_x^2/2\mu_o$, and this pressure distribution has been graphed in FIG. 10 for different points in phase. The peak pressure is developed when the liner magnetic poles directly oppose the stator poles after having advanced by one pole pitch, $\lambda=\pi/k=\int v_x dt$. When the liner has advanced two full pole pitches (at conditions $k\int v_x dt=2\pi$), as shown in FIG. 7, the "x" component of the magnetic field $B_x$ is zero everywhere, and the system has reached a state similar to the initial state.

The pressure peak should best be made to coincide with the moment of peak compression. The decaying part of the pressure pulse (from $\lambda$ to $2\lambda$) serves to radially decelerate the liner rebound and to recuperate its rebound energy in the form of rotational velocity of the liner, as discussed previously.

The pressure pulse has an azimuthal ripple of wavelength $\lambda$, and thus only a part of the liner outer surface 17 will be driven inward. However, due to the multiplicity of poles and because the liner is thick ($r_2>>r_1$), the inner liner surface 15 will implode with a high degree of circularity.

The radial displacement of the outer liner surface was not included in the analysis of Equations 5-7. The mean outer radial displacement $\overline{\Delta r_2}$ may be given by $$\overline{\Delta r_2}=r_1^2/2r_2 \quad (8)$$

For typical liner values of inner radius $r_1$ of 0.4 meters and outer radius $r_2$ of 1.6 meters, the mean displacement $\overline{\Delta r_2}$ is about 0.05 m. Since the effective gap g, which in the illustrated embodiment may consist of about half the stator conductor depth plus the insulation, may be on the order of about 0.1 meter $\overline{\Delta r_2}$ is relatively small, and its neglect is not a major source of error in the foregoing discussion.

In the illustrated embodiment, as an example, the field $B_o$ may have a strength of 1.4 Tesla, and the product, kg, of the inverse pole pitch parameter k and the gap may be about 0.45. Then the peak value of the "x" component $B_x$ may be about 6 Tesla. The liner dynamics will be essentially incompressible until nearly the moment of rebound. Equations 3-7 of the above incorporated Ohkawa paper can then be used to calculate the duration, $\tau_c$, of the implosion (compression) phase Ohkawa's equation may be written in any consistent set of units as:

$$\left[\frac{2}{\rho\ln(r_2/r_1)}\int_0^{\tau_c}\int p\,dt\,dt\right]^{\frac{1}{2}} \simeq r_1 \quad (9)$$

where p is the inward liner driving pressure. Since the ratio of the instantaneous velocity $v_x$ to its initial value $v_o$ is approximately equal to one ($v_x/v_o \simeq 1$), then according to Equation (7) a suitable approximate expression for the liner driving pressure p is $$p=p_o\sin^2(kv_ot/2) \quad (10)$$

where $p_o=(2B_o/kg)^2/2\mu_o$. The compression time $\tau_c$ should equal $\pi/kv_o$ to match the motor pole periodicity, for reasons discussed above. The double time integral of the pressure then becomes $$\int_0^{\tau_c}\int p\,dt\,dt = \left(\frac{\pi^2}{4} - 1\right) p_o/(kv_o)^2 \simeq 1.47\, p_o/(kv_o)^2 \quad (11)$$

and then Equation 9 gives $$k = \frac{1.71}{r_1 v_o}\left[\frac{p_o}{\rho \ln(r_2/r_1)}\right]^{\frac{1}{2}} \quad (12)$$

As an example, consider the illustrated embodiment in the case where the field strength $B_o$ is 1.3 Tesla, the product kg is 0.5 and $p_o$ is $1.1\times10^7$ nt/m$^2$. For a liquid NaK liner, having a mass density $\rho$ of about 900 kg/m$^3$, and for an inner liner radius $r_1$ equal to 0.4 meter and an outer liner radius $r_2$ equal to 1.6 meters, the angular velocity $\Omega$ will be 52.7 radians per second, as obtained from Equation (1) for $r_m$ equal to 0.01 meter and $B_m$ equal to 100 Tesla. Then, since $v_o=\Omega_o r_2=84.3$ m/s, Equation (12) gives $k=4.7$ m$^{-1}$. It follows that the compression time will be $\tau_c=\pi/kv_o=8\times10^{-3}$ seconds. Since kg=0.5, we have a reasonable gap width g of 0.11 meters. In this example, the pole pitch is $\lambda=\pi/k=0.67$ m, which would give exactly 15 poles around the device. Since the number of poles must be even, either a 14 pole or a 16 pole stator would be selected.

In the preceding example it was simply assumed that the peak implosion inner radius $r_m$ would be 0.01 meters and that the peak implosion axial magnetic field strength $B_m$ would be 100 Tesla. The peak compression can be calculated approximately for the time-dependent pressure given in Equation (10) by balancing energies. The liner conserves angular momentum as it is compressed, which causes the inner surfaces of the liner to rotate at a higher rate. The energy $U_L$ required by this increased rate of rotation is given by the equation $$U_L=\pi\Omega_o^2\rho[r_1^4 \ln r_2/r_m+\tfrac{1}{2}r_1^2(r_2^2-r_1^2)] \quad (13)$$

The energy of the compressed magnetic field $U_M$ is $$U_M=\pi r_m^2 B_m^2/2\mu_o \quad (14)$$

Through the use of Equation (1), the total compression energy $U_c$ can be written as:

$$U_c = U_M + U_L = \pi r_m^2\frac{B_m^2}{2\mu_o}\left[1+\frac{4}{5}+\frac{2}{5}\;\frac{r_2^2-r_1^2}{r_1^2\ln(r_2/r_m)}\right] \quad (15)$$

On the other hand, energy balance requires $U_c$ be provided by the pressure acting on the liner outer surface, that is $$U_c = -\int_{\pi r_1^2}^{\pi r_m^2} p\,dV \quad (16)$$

where V is the volume of the hollow flux-trapping volume. Inspection of the previously referred to Ohkawa equation shows that the volume V of the hollow compression zone can be written approximately as $$V\simeq\pi r_1^2[1-(t/\tau_c)^2] \quad (17)$$

per unit length. Then the integral of Equation (16) may be readily evaluated, with the result that $$U_c = \left[\tfrac{1}{2}+\frac{2}{\pi^2}\right]\pi r_1^2 P_o = 0.703\,\pi r_1^2 P_o \quad (18)$$

Equating the two equations (15) and (18) for $U_c$ produces the following relationship:

$$r_m B_m = (1.4\mu_o p_o)^{\frac{1}{2}} R \div \left[1.8 + 0.4\frac{r_2^2-r_1^2}{r_1^2\ln(r_2/r_m)}\right]^{\frac{1}{2}} \quad (19)$$

For our example with $r_1=0.4$ m, $B_o=1.3$ T and kg=0.5 we get $r_m B_m=1.0$ (Tesla meters), as was assumed in the earlier example.

In reality the liner is not rigid, but fluid. The primary effect introduced by this fact is that the fluid's azimuthal motion and the coupling between the fluid and its trapped magnetic flux from the stator are governed by shear Alfven wave motion [H. Alfven, *Cosmical Electrodynamics*, Clarendon Press, Oxford (1950), Chapter 4]. As a result it is desirable to make the liquid liner of at least three principal layers of immiscible, stratified liquids, illustrated by the cross sectional view of FIG. 11. When it is desired to compress magnetic flux in the compression zone, the innermost liquid 42 of the illustrated embodiment must be a molten, electrically conductive metal (e.g., sodium-potassium alloy, magnesium or aluminum) to trap and compress the longitudinal magnetic flux as previously described. The middle liquid 44 should best be electrically insulating or only weakly conductive, and denser than the innermost liquid (for example, organic liquids, molten salts, etc.). The outermost liquid 46 must be electrically conductive and is preferably much denser than the other two liquids (e.g., molten copper, lead, mercury, etc.). The Alfven waves are reflected from the insulating interface 45. Thus the stratified liner prevents large amounts of driving energy from being transported via Alfven waves to the interior of the liner and lost. If the system is used to compress or pump fluids other than magnetic flux, the conductive inner liner layer 42 need not be used. In any liner embodiment, it may be desirable to provide a thin nonconductive layer (e.g., $Hg_2F_2$) between the outer rotation-driving layer 46 and the inner surface of the stator to reduce magneto-hydrodynamic losses. The maximum theoretical magnetic driving pressure that can be developed by the interaction between the fluid and the trapped magnetic fluxes as presented in this invention is limited by the Alfven wave dynamics (and conservation of energy) to $$p_{max}=\tfrac{1}{2}\rho_2 v_o^2$$

where $\rho_2$ is the mass density of the outermost liquid and $v_o=r_2\Omega_o$ as defined previously. If $p_{max}$ is much greater than $p_o$ (see Eq. 10), by at least 2.5 or 3 times, and if the thickness, b, of the outer liquid layer is less than a wave transit time across the layer during the compression time $$b < v_A\tau_c$$

where $v_A = B_o(\mu_o \rho_2)^{-\frac{1}{2}}$ is the Alfven wave velocity, then the dense outer liquid cylindrical shell behaves essentially and substantially as discussed previously when treated as a rigid rotor. (Equations 5–7). In keeping with the particular embodiment of the invention previously discussed, the innermost liquid may be the sodium-potassium alloy NaK. The middle liquid may be a mixture of light oil and carbon tetrachloride ($CCl_4$), with the proportions of the mixture adjusted to give a liquid having specific gravity of about 1.0. The outermost liquid may be mercury, whose mass density is $\rho_2 = 13{,}600$ kg/m$^3$. For $B_o = 1.3$ Telsa, the Alfven wave speed is 9.94 m/s and $v_A \tau_c = 0.05$ m. The thickness b of the mercury layer should then be less than 5 cm, preferably about 3 cm. The kinetic energy contained in even such a thin layer, $\pi r_2 b \rho_2 U_o^2 = 14.6 \times 10^6$ joule/m, still greatly exceeds the total compression energy required (Equation 18) of $3.8 \times 10^6$ joule/m, which demonstrates that the compression is energetically possible. Finally, $p_{max}$ from Equation (20) is $4.8 \times 10^7$ nt/m$^2$ which greatly exceeds the pressure, $p_o = 1.07 \times 10^7$ nt/m$^2$. Therefore, it is demonstrated that the thin mercury outer liquid of the embodiment of FIG. 11, acting upon the trapped stator and liner fluxes, provides for compression of the whole liner and the trapped longitudinal magnetic field.

The previous discussion has been primarily directed to the longitudinal and radial aspects of apparatus embodying various features of the present invention. In connection with the end construction of such apparatus, it will be appreciated that the details of such construction may depend on the particular use intended for the apparatus. Illustrated in FIG. 8, which is a cross sectional side view, along a plane through the longitudinal axis, is an embodiment of end construction for the apparatus of FIG. 1 which is adaptable for various types of uses. In this connection, it should be appreciated that while only one end of the apparatus is shown, the construction of the other end may be made symmetrical with or similar to that illustrated in FIG. 8. In the particular end construction of the embodiment of FIG. 8, insulating end piece 102, which may be of silicon carbide, is secured by retaining ring 104 to structural shell 106 in order to contain liquid liner 14. Shell 106 may be of any convenient non-magnetic structural material, such as 300 series stainless steel, and the shell may also serve as a convenient support for the magnetic coils 36 and the laminated stator 12 with its windings 20. Since the pressure exerted by the liner when $r_1$, the radius of its inner surface 15, is less than about 4 $r_m$ would damage the end piece 102, a hole 108 of radius 4 $r_m$ is provided. Therefore, a small area of the liner will not be contained during the final stage of the compression (shown in dashed lines as 110), but the small amount of liner liquid lost in inconsequential and may be periodically replaced in a non-compression part of the cycle. A chamber 112 may be provided to recover the lost liner liquid and to allow for vacuum or other special conditions to be maintained in the compression volume 18.

Additional structural elements may be desirable depending on the intended use for the apparatus. Thus, suitable gas supply fittings and measurement instrumentation may be provided if it is desired to use the apparatus in compression of gases and/or the study of compressed gases. Similarly, if it is desired to use the apparatus in the compression of magnetic fields to provide high flux values, for example for testing materials or determining material properties at very high flux values, suitable and appropriate sample holding elements and measurement instrumentation may be used in accordance with known technology. For such applications, the axial length of the liquid liner of the apparatus may be relatively short, for example, in the range of from about 1 to about 2 meters in length.

In addition to their utility in the provision of very strong pulsed compressional forces and magnetic fields, apparatus and methods in accordance with the present invention which are adapted for use as plasma systems have particular utility in the study and analysis of the properties and behavior of plasmas, and in particular, the study and analysis of plasmas which are magnetically confined at relatively high beta ratios. Further in this connection, the invention may be used in the generation, confinement, study and analysis of hydrogen plasmas (i.e., from hydrogen, deuterium, tritium and mixtures thereof such as deuterium-tritium mixtures) at high temperatures and high beta ratio magnetic confinement conditions, although the invention may also be used in the production of plasmas containing highly stripped elements of higher atomic number. Accordingly, the methods and apparatus of the present invention find utility as analytical techniques and instrumentation in respect of matter in the plasma state. In this connection, the apparatus may be provided with conventional diagnostic and measurement elements including magnetic probes, inductive pickup loops, particle detectors, photographic and spectrographic systems, microwave and infrared detection systems and other appropriate elements, the data outputs of which may be utilized directly or recorded, such as by transient data recorders.

The utilization of a magnetic field to force a plasma inwardly to a constricted volume and substantially increase the temperature and the density of the plasma is conventionally referred to as an application of the "pinch effect," and as previously indicated, imploding liners for compressing a trapped axial magnetic field have been investigated for pulsed plasma compression using the pinch effect. In an imploding liner plasma system, a compressed magnetic field, for example up to a few megagauss, may radially confine a long, straight, high-beta plasma at high temperature (e.g., 10 keV) and high density (e.g., $10^{24}-10^{25}$ m$^{-3}$). The relatively high plasma density permitted by megagauss fields provides for "break-even" deuterium-tritium fusion at relatively long energy confinement times. Thus, imploding liner confinement systems may be shorter than non-imploding but otherwise generally similar linear theta pinch apparatus, while retaining the favorable stability and transport properties of such theta pinch systems.

Molten lithium is a preferred liquid liner material (particularly at the interior surface of the liner immediately adjacent the plasma zone) for certain plasma applications since it is capable of breeding tritium in a fusion environment and also is capable of serving as a blanket for neutrons or other particles.

In such systems and with particular reference to FIG. 8, plasma may be generated by apparatus shown by dotted line in that figure, it being understood that the two ends of the apparatus may be of similar construction with plasma being injected from each end, meeting in the center of the axial compression zone.

Parameters for an initial hydrogen (e.g., D-T) plasma for the apparatus may typically be: electron and ion particle densities $n_e = n_i = 5 \times 10^{21}$ m$^{-3}$, temperature T=100 eV, and a liquid liner radius of about 1.0 meter corresponding to an internal energy of 0.75 MJ per meter of length. High efficiency coaxial plasma guns 124 producing low divergence streams of pure plasma are well known [e.g., "Plasma Deflagration and the Properties of a Coaxial Plasma Deflagration Gun," D. Y. Cheng, Nuclear Fusion, 10, (1970) p. 305], and are capable of being scaled up to large sizes and energy ratings ["Scaling of Deflagration Plasma Guns," Chang, et al., Bull, APS, Series II, 10, (1975, p. 1348]. Ablator spheres 126, rotated by motors 120, are synchronized to pass in front of the plasma guns 124 after injection, but before the plasma has been greatly heated and compressed, to protect the plasma guns from high energy plasma escaping through holes 108. A time interval of about 3 msec exists to accomplish this, requiring that the ablator be rotated at about 3000 to 4000 rpm in this example. The injected plasma will expand into the vacuum region 58 until a pressure balance at $\beta=1$ is reached between the plasma and the initial axial magnetic flux from coils 80 trapped by the conducting liner. The axial magnetic field thus insulates the plasma 82 from the inner surface of the liner, just as in a conventional theta pinch plasma discharge.

The various aspects of the invention may also find utility as, or in the design or development of, fusion systems, which of course, need not necessarily be net power producers in order to be utilizable as neutron or other particle or fusion product generators, isotope generators, etc.

Although the present invention has been particularly described with respect to certain specific embodiments, it will be appreciated that various modifications, adaptations and applications will become apparent in view of the specification, and are included within the spirit and scope of the invention as defined by the appended claims. Various of the features of the present invention are set forth in the following claims.

What is claimed is:

1. Apparatus for compressing a magnetic field to provide a region of high magnetic flux density, comprising an electrically conductive liquid liner, induction motor stator means for confining said liner and for providing a rotating stator multipolar magnetic field to inductively rotate said electrically conductive liner at a predetermined rotational velocity and to produce a multipolar rotor magnetic field substantially synchronously rotating with said liner and said stator field in a conductive outer surface of said rotating liner, said liquid liner having a volume less than the volume of said stator means such that upon rotation of said liquid liner by said stator means, said liner forms a thick rotating liner body having a cylindrical electrically conductive inner surface, means for providing an axial magnetic field longitudinally of the axis of rotation of said stator field, means for abruptly stopping the rotation of said stator field to provide a stationary stator field and for abruptly converting kinetic rotational energy of said liner means to implosive kinetic energy through repulsive interaction of said stationary multipolar stator field and said rotating multipolar rotor magnetic field to compress said liner and abruptly reduce the radius of said inner surface and to compress said axial magnetic field by interaction thereof with said conductive inner surface, and means for reinitiating the rotation of said multipolar stator field in phased relationship with said rotating multipolar rotor field of said liquid liner such that upon expansion of said compressed liner, outward radial expansion energy of said liquid liner is converted to rotational kinetic energy of said liner to rotationally reaccelerate said liquid liner.

2. An apparatus in accordance with claim 1 wherein said stator means provides said liner with a rotational velocity such that the liner rotates about one motor pole wavelength during an implosion cycle time of the liner.

3. A method for compressing a magnetic field to provide a zone of high magnetic flux density comprising the steps of providing an electrically conductive liquid liner, confining said liner material in a cylindrical rotation zone, providing a rotating multipolar stator field around said liquid liner to induce a multipolar magnetic rotor field in said liner and to rotate said liquid liner in said rotation zone to produce a thick, rotating, cylindrical liquid liner having an electrically conductive inner surface and having a ratio of outer radius to inner radius of at least about 3, providing an axial magnetic field along the axis of rotation of said liquid liner, stopping the rotation of said stator field while maintaining rotation of said liquid liner and said rotor field to produce repulsive interaction between said stator field and said liner field such that kinetic rotational energy of said rotating liner is converted to kinetic implosion energy of said rotating liner to abruptly reduce the inner radius of said liquid liner and to compress said axial magnetic field by electromagnetic interaction with said electrically conductive inner surface, and reinitiating the rotation of said multipolar stator field in phased relationship with said rotating multipolar field of said liquid liner such that upon expansion of said compressed liner, outward radial expansion energy of said liquid liner is converted to rotational kinetic energy of said liner to rotationally reaccelerate said liquid liner.

4. Apparatus in accordance with claim 1 further comprising means for providing a plasma in the cylindrical region defined by said inner surface of said rotating liner, and wherein the ratio of the outer radius of said rotating liner to said inner radius of said rotating liner is at least about 3.

5. A method in accordance with claim 3 further comprising the step of generating a plasma in the zone defined by said inner surface of said rotating liquid liner such that said plasma is compressed upon said compression of said axial magnetic field.

* * * * *